United States Patent Office 3,466,300
Patented Sept. 9, 1969

3,466,300
METHOD FOR PRODUCING ANHYDRIDES BY CATALYTIC OXIDATION OF AROMATIC HYDROCARBONS
Stefan Vedrilla, Cologne-Junkersdorf, Germany, assignor to Chemiebau Dr. A. Zieren G.m.b.H. & Co., K.G., Cologne-Braunsfeld, Germany, a corporation of Germany
No Drawing. Filed Apr. 10, 1967, Ser. No. 629,375
Claims priority, application Germany, Apr. 19, 1966, C 38,808
Int. Cl. C07d 5/32, 5/34
U.S. Cl. 260—346.4                10 Claims

ABSTRACT OF THE DISCLOSURE

An improved process for producing anhydrides of dicarboxylic acids by passing a mixture of air and vaporized aromatic hydrocarbons through a multi-stage contact apparatus, in which the temperature rise in each of the first group of catalytic oxidation stages of the apparatus is about 50 to 60° C., until a 50% overall conversion is reached. The temperature rise in each of the succeeding stages is maintained below 50° C. per stage. The temperature of the partially oxidized gaseous reaction mixture is cooled between each succeeding stage to the initial temperature required for the oxidation. In a preferred embodiment of the invention, the heat given off in cooling between each of the first stages wherein the temperature rise is 50° or more, is used to pre-heat the feed reaction mixture.

Background of the invention

The production of anhydrides of dicarboxylic acids, e.g., phthalic anhydrides or maleic anhydride, by the catalytic oxidation of a mixture of air and a vaporized aromatic hydrocarbon is known. The catalysts are commonly arranged in a tube or in separated contact stages. Since the catalytic oxidation precedes most advantageously over a specified temperature range, this factor, together with the relatively large quantity of heat evolved during the catalytic oxidation, requires a multi-stage process to obtain high yields. This is different from other catalytic oxidations, e.g., $SO_3$ production.

Since the initial temperature for each oxidation stage is about the same, it is necessary to cool the reaction mixture between successive oxidation stages. This is conventionally accomplished either indirectly utilizing heat exchangers, or directly by mixing the hot gas stream with air, water or hydrocarbons. Direct cooling with air results in an unnecessarily large volume of gases and a small yield of the anhydride product due to its volatility and from losses with the exhaust gas. Direct cooling with water involves difficulties resulting from condensation of the oxidation product.

Indirect cooling of the reaction mixture between the stages has utilized a cooling medium which is heated. The heat input to the cooling medium is subsequently utilized in another manner, e.g., steam utilization. It is suggested that the feed gas stream composed of the vaporized aromatic hydrocarbon and the air entering the contact apparatus, should be preheated by utilizing it as the cooling medium in heat exchange with the reaction mixture being cooled after each of the oxidation stages. This proposal has a defect in that the feed gas stream cannot be preheated to the necessary high temperature required for the first oxidation stage, since it is necessary to maintain relatively low temperatures in the last oxidation stages, to obtain a high yield.

The art believes that it is necessary to limit the rise in temperature of the reaction mixture in each oxidation stage resulting from the exothermic oxidation reaction, to a maximum of between 25 and 35° C. This small temperature rise in each stage which would require the same amount of cooling between each stage, was sufficiently low that no interest was directed to utilizing this heat for preheating the feed gases to the contact apparatus.

Summary of the invention

The present invention provides an improvement of multi-stage catalytic oxidation of aromatic hydrocarbons to produce anhydrides of dicarboxylic acids, the improvement comprising controlling the temperature rise of each stage of the first group of contact stages to about 50° C.– 60° C., and to use the feed gases to cool the partially reacted gases between each of the individual contact stages comprising the first group of contact stages.

Description of the preferred embodiments

The oxidation of the reaction mixture until the overall conversion is about 50%, may be accomplished in the first four oxidation contact stages. The temperature rise in each of the succeeding (after the aforedescribed first group) oxidation contact stages is maintained below 50° C. Each of the succeeding stages (after the first group) preferably has a lower temperature rise than the immediately preceding stage, culminating with a preferred temperature rise of only between about 5° C. and 15° C. in the last stage of the contact apparatus.

The mixture of air and vaporized aromatic hydrocarbon which is the feed gas in the contact paparatus is utilized to cool the reaction mixture after each stage of the first group of oxidation stages, i.e., those stages wherein the temperature rise is 50° or higher. The total heat input to the feed gases as a result of this heat exchange is sufficient to preheat the feed gases to the initial temperature necessary for the catalytic oxidation in the first contact stage. For example, when using a known vanadium oxide catalyst, the initial temperature is approximately 350° C. Cooling the reaction mixture after each of the contact oxidation stages (after the first group) wherein the temperature rise is less than 50° C. may be accomplished with a conventional heat exchange medium, e.g., diphenyl-diphenyl oxide.

The process of the present invention is particularly adapted and suitable for the production of phthalic anhydride resultant from the catalytic oxidation of a mixture of air and the vaporized aromatic hydrocarbon, particularly naphthalene or o-xylene. The process is also useful for the production of related materials, e.g., maleic anhydride, by the catalytic oxidation of suitable mixtures of air and the vaporized aromatic hydrocarbon material.

The following example further illustrates the process of the present invention to those skilled in the art.

A catalytic oxidation contact apparatus having fourteen contact stages was utilized. o-Xylene is oxidized to phthalic anhydride by catalytically oxidizing a mixture of air and the o-xylene. Air containing 40 grams of o-xylene per $N_m^3$ of air, is preheated to 148° C. and utilized as the feed gas to the apparatus. The feed gas, before introduction into the first contact stage, is utilized to cool the partially reacted mixtures exiting from each of the first four contact stages. The initial temperature for the catalytic oxidation using the vanadium oxide catalyst is 350° C. The temperature of the reaction gas introduced to each stage of the contact apparatus, and also its exit temperature from said stage, and its inlet and exit temperatures through the heat exchanger immediately following each contact stage, is shown in the following table, together with the temperatures of the feed gases used as the cooling medium in said heat exchangers.

|  | Reacting gas | | Feed gas used for cooling reacting gas | |
|---|---|---|---|---|
|  | Inlet, °C. | Outlet, °C. | Inlet, °C. | Outlet, °C. |
| First stage heat exchanger. | 350 400 | 400 350 | 146 | 198 |
| Second stage heat exchanger. | 350 400 | 400 350 | 198 | 250 |
| Third stage heat exchanger. | 350 400 | 400 350 | 250 | 301 |
| Fourth stage heat exchanger. | 350 400 | 400 350 | 301 | 350 |

The reaction mixture was substantially 50% converted at the completion of the fourth contact stage. The temperature rise in each of the following ten contact stages, together with the exit temperatures are shown in the following table.

| Stage No. | Inlet temperature, °C. | Exit temperature, °C. | Temperature rise, °C. |
|---|---|---|---|
| 5 | 350 | 396 | 46 |
| 6 | 350 | 394 | 44 |
| 7 | 350 | 388 | 38 |
| 8 | 350 | 384 | 34 |
| 9 | 350 | 380 | 30 |
| 10 | 350 | 376 | 26 |
| 11 | 350 | 372 | 22 |
| 12 | 350 | 370 | 20 |
| 13 | 350 | 368 | 18 |
| 14 | 350 | 365 | 15 |

Oxidation was completed after the fourteenth stage. The exhaust gas was then cooled in a steam boiler and condensed to yield the product phthalic anhydride.

Similar results are obtained when utilizing the process of the present invention with such feed materials as naphthalene, benzene and quinone.

The present invention is based in part on the surprising discovery that the temperature in each of the first stages of the contact oxidation may be raised as much as 50° or more, rather than the 35° C. maximum temperature raise taught by the prior art. It has been found that it is not useful to attempt to utilize the gases from the last contact stages, e.g., the last contact stage where the temperature rise is only 15° C., to preheat the feed gases to the high initial temperature required for the catalytic oxidation. The present process provides an improved yield of phthalic anhydride compared with prior processes which attempted to use the exhaust gases from the last contact stage to preheat the feed gases to the 350° C. initial catalytic oxidation temperature. Such attempts generally require that the gases being cooled have a minimum temperature of at least 370° C., and preferably a temperature of 380° C. The use of exhaust gases having lower temperatures would require heat exchangers having non-economically large heat exchange areas.

The illustrative example indicates that the feed gases and concomitantly heating them to the starting temperature of 148° C., before utilizing them as cooling medium and concomitently heating them to the starting temperature necessary for the catalytic oxidation. The essential feature of the present invention which is to heat the feed gases in heat exchangers between the contact stages, to the initial catalytic oxidation temperature.

What is claimed is:
1. In the process for producing anhydrides of dicarboxylic acids by oxidizing an aromatic hydrocarbon with air comprising preparing a feed gaseous mixture of a gaseous aromatic hydrocarbon and air, heating said gaseous mixture to the initial temperature for catalytically oxidizing said aromatic hydrocarbon and then catalytically oxidizing the heated gaseous mixture in a multi-stage catalytic oxidation, the improvement comprising
catalytically oxidizing sufficient of the gaseous mixture of said aromatic hydrocarbon and air in each stage of a first group of contact stages to raise the temperature in each of said stages between 50° and 60° C., said first group of contact stages being those necessary to convert about 50% of the aromatic hydrocarbon into product,
cooling the effluent gas from each of said contact stages of said first group to said initial temperature before entering the subsequent contact stage by heat exchange contact with said feed gaseous mixture thereby heating said gaseous mixture to the initial temperature for entry into the first contact stage,
catalytically oxidizing sufficient of the effluent gas from the last stage of said first group of contact stages, sequentially, in each stage of a second group of contact stages to raise the temperature in each stage of said second group by less than 50° C., and
cooling the effluent gas from each stage of said second group of contact stages to the initial temperature before said gas enters the subsequent contact stage.
2. The process of claim 1 wherein the effluent gas from each stage of said second group of contact stages is cooled by a conventional heat exchange medium to the initial temperature of the subsequent stage.
3. The process of claim 1 wherein said catalytic oxidation is carried out in the presence of a vanadium oxide catalyst.
4. The process of claim 3 wherein four contact stages comprise said first group of contact stages.
5. The process of claim 1 wherein the temperature rise in each of the contact stages in said second group of contact stages is less than in the immediately preceding stage.
6. The process of claim 5 wherein said temperature rise in the last stage of said second of contact stages is between 5° C. and 15° C.
7. The process of claim 6 wherein said catalytic oxidation is carried out in the presence of a vanadium oxide catalyst.
8. The process of claim 1, 4, 5, or 6, wherein said gaseous aromatic hydrocarbon is selected from the group consisting of naphthalene, o-xylene, benzene and quinone.
9. The process of claim 1, 4, or 6, wherein said gaseous hydrocarbon is o-xylene which is heated with air to an initial starting temperature of about 350° C., and catalytically oxidized to phthalic anhydride.
10. The process of claim 1, 4, or 6, wherein said aromatic hydrocarbon is naphthalene which is catalytically oxidized to phthalic anhydride.

References Cited

UNITED STATES PATENTS 3,072,465   1/1963   Benichou et al. _____ 260—346.4

NICHOLAS S. RIZZO, Primary Examiner

BERNARD I. DENTZ, Assistant Examiner